(12) United States Patent
Cappelle

(10) Patent No.: US 10,214,918 B2
(45) Date of Patent: Feb. 26, 2019

(54) FLOOR PANEL FORMING A FLOOR COVERING, FLOOR COVERING FORMED FROM SUCH FLOOR PANELS AND METHODS FOR MANUFACTURING SUCH FLOOR PANELS

(71) Applicant: FLOORING INDUSTRIES LIMITED, SARL, Bertrange (LU)

(72) Inventor: Mark Cappelle, Staden (BE)

(73) Assignee: FLOORING INDUSTRIES LIMITED, SARL, Bertrange (LU)

( * ) Notice: Subject to any disclaimer, the term of this patent is extended or adjusted under 35 U.S.C. 154(b) by 0 days.

(21) Appl. No.: 15/712,489

(22) Filed: Sep. 22, 2017

(65) Prior Publication Data
US 2018/0038115 A1 Feb. 8, 2018

Related U.S. Application Data

(63) Continuation of application No. 14/377,292, filed as application No. PCT/IB2013/050781 on Jan. 30, 2013, now Pat. No. 9,771,721.
(Continued)

(30) Foreign Application Priority Data

Feb. 7, 2012 (AZ) ................................ U 20120003
Jul. 12, 2012 (BE) .................................. 2012/0490

(51) Int. Cl.
*E04F 15/02* (2006.01)
*E04F 15/10* (2006.01)
(Continued)

(52) U.S. Cl.
CPC .......... *E04F 15/02038* (2013.01); *B32B 3/06* (2013.01); *B32B 5/022* (2013.01);
(Continued)

(58) Field of Classification Search
CPC . E04F 15/02038; E04F 15/107; E04F 15/102; E04F 15/105; E04F 2201/0153
See application file for complete search history.

(56) References Cited

U.S. PATENT DOCUMENTS

| 7,451,578 B2 | 11/2008 | Hannig |
| 7,454,875 B2 | 11/2008 | Pervan et al. |

(Continued)

FOREIGN PATENT DOCUMENTS

| BE | 1019659 A5 | 9/2012 |
| DE | 202009004530 U1 | 6/2009 |

(Continued)

OTHER PUBLICATIONS

Belgian Search Report from Belgian Application No. BE 2012/0490, dated Sep. 27, 2013.
(Continued)

*Primary Examiner* — Patrick J Maestri
(74) *Attorney, Agent, or Firm* — Workman Nydegger

(57) ABSTRACT

A floor panel is arranged for forming a floor covering, and substantially consists of synthetic material and has a decorative upper side. The floor panel, on at least one pair of opposite edges, comprises coupling parts which allow coupling two of such floor panels to each other. The coupling parts effect a locking in a first direction perpendicular to the plane of the floor panels as well as in a second direction perpendicular to the respective edge and in the plane of the floor panels. The at least one of the coupling parts comprises a separate locking element, which, in coupled condition, provides for at least a locking in the first direction.

25 Claims, 6 Drawing Sheets

Related U.S. Application Data

(60) Provisional application No. 61/696,505, filed on Sep. 4, 2012.

(51) Int. Cl.

| | | |
|---|---|---|
| *F16B 5/00* | (2006.01) |
| *B32B 5/02* | (2006.01) |
| *B32B 27/08* | (2006.01) |
| *B32B 27/12* | (2006.01) |
| *B32B 27/20* | (2006.01) |
| *B32B 27/30* | (2006.01) |
| *B32B 3/06* | (2006.01) |
| *B32B 27/22* | (2006.01) |
| *E04F 15/04* | (2006.01) |

(52) U.S. Cl.
CPC .............. *B32B 27/08* (2013.01); *B32B 27/12* (2013.01); *B32B 27/20* (2013.01); *B32B 27/22* (2013.01); *B32B 27/304* (2013.01); *E04F 15/02* (2013.01); *E04F 15/105* (2013.01); *E04F 15/107* (2013.01); *F16B 5/008* (2013.01); *B32B 2262/101* (2013.01); *B32B 2264/104* (2013.01); *B32B 2307/308* (2013.01); *B32B 2307/412* (2013.01); *B32B 2307/414* (2013.01); *B32B 2307/554* (2013.01); *B32B 2419/04* (2013.01); *B32B 2451/00* (2013.01); *B32B 2471/00* (2013.01); *E04F 15/04* (2013.01); *E04F 2201/0146* (2013.01); *E04F 2201/0153* (2013.01); *E04F 2201/023* (2013.01); *E04F 2201/043* (2013.01); *E04F 2201/049* (2013.01); *E04F 2201/0523* (2013.01); *E04F 2201/0535* (2013.01); *E04F 2201/0588* (2013.01)

(56) References Cited

U.S. PATENT DOCUMENTS

| | | |
|---|---|---|
| 7,603,826 B1 | 10/2009 | Moebus |
| 7,874,118 B2 | 1/2011 | Schitter |
| 7,980,043 B2 | 7/2011 | Moebus |
| 8,024,904 B2 | 9/2011 | Hannig |
| 8,071,193 B2 | 12/2011 | Windmoller |
| 8,132,384 B2 | 3/2012 | Hannig |
| 8,631,621 B2 | 1/2014 | Hannig |
| 8,966,853 B2 | 3/2015 | Hannig |
| 2002/0189183 A1 | 12/2002 | Ricciardelli |
| 2004/0211143 A1 | 10/2004 | Hannig |
| 2005/0050827 A1 | 3/2005 | Schitter |
| 2005/0079780 A1 | 4/2005 | Rowe et al. |
| 2008/0010938 A1 | 1/2008 | Hannig |
| 2008/0138560 A1 | 6/2008 | Windmoller |
| 2009/0249733 A1 | 10/2009 | Moebus |
| 2010/0017453 A1 | 1/2010 | Held et al. |
| 2010/0281803 A1 | 11/2010 | Cappelle |
| 2011/0056167 A1 | 3/2011 | Nilsson |
| 2011/0088346 A1 | 4/2011 | Hannig |
| 2011/0138722 A1 | 6/2011 | Hannig |
| 2011/0271632 A1 | 11/2011 | Cappelle et al. |
| 2011/0296780 A1 | 12/2011 | Windmoller |
| 2012/0011796 A1 | 1/2012 | Hannig |
| 2012/0135203 A1 | 5/2012 | Albert et al. |
| 2013/0047536 A1 | 2/2013 | Pervan |
| 2014/0150369 A1 | 6/2014 | Hannig |

FOREIGN PATENT DOCUMENTS

| | | | |
|---|---|---|---|
| EP | 1512808 A1 | 3/2005 |
| EP | 1938963 A1 | 7/2008 |
| EP | 2440724 B1 | 5/2014 |
| SE | 1150803-3 | 9/2011 |
| WO | 9747834 A1 | 12/1997 |
| WO | 0188306 A1 | 11/2001 |
| WO | 03016654 A1 | 2/2003 |
| WO | 2006043893 A1 | 4/2006 |
| WO | 20070156669 A2 | 2/2007 |
| WO | 2007141605 A2 | 12/2007 |
| WO | 2008004960 A2 | 1/2008 |
| WO | 2008060232 A1 | 5/2008 |
| WO | 2009066153 A2 | 5/2009 |
| WO | 2009116926 A1 | 9/2009 |
| WO | 2010023042 A1 | 3/2010 |
| WO | 2011077311 A2 | 6/2011 |
| WO | 2011141849 A2 | 11/2011 |
| WO | 2011141850 A1 | 11/2011 |
| WO | 2011141851 A2 | 11/2011 |
| WO | 2012004699 A2 | 1/2012 |
| WO | 2012004700 A2 | 1/2012 |
| WO | 2012004701 A2 | 1/2012 |
| WO | 2012049577 A2 | 4/2012 |
| WO | 2013179260 A1 | 12/2013 |
| WO | WO-2013179261 A1 * | 12/2013 | ........... B29C 70/081 |

OTHER PUBLICATIONS

International Search Report and Written Opinion from PCT Application No. PCT/IB2013/050781, dated Oct. 7, 2013.

* cited by examiner

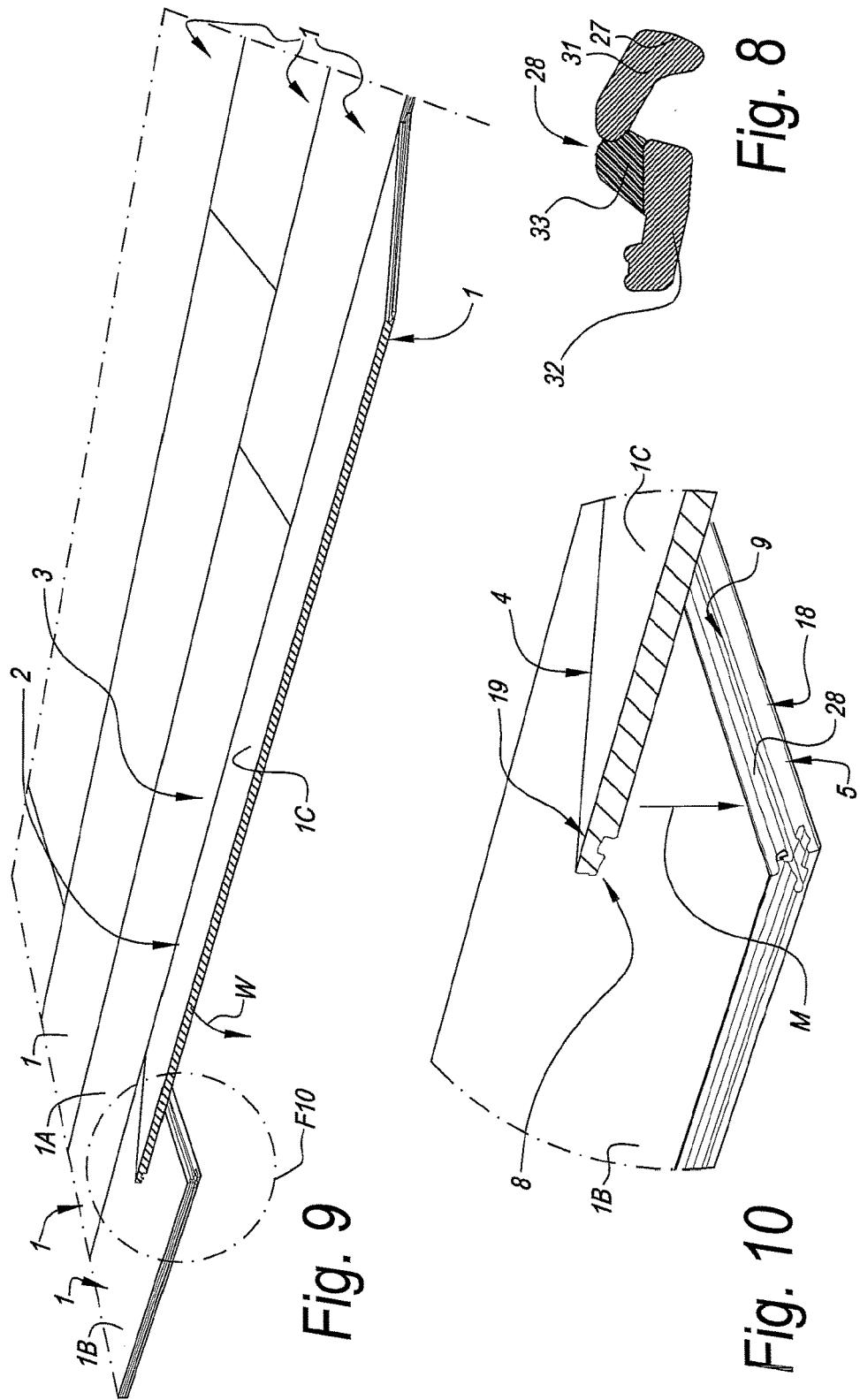

FLOOR PANEL FORMING A FLOOR COVERING, FLOOR COVERING FORMED FROM SUCH FLOOR PANELS AND METHODS FOR MANUFACTURING SUCH FLOOR PANELS

BACKGROUND

1. Field of the Disclosure

This invention relates in the first place to a floor panel for forming a floor covering, as well as to a floor covering formed from such floor panels and to a method for manufacturing such floor panels. More in general, it can also be applied for other panels than floor panels, thus, for forming coverings other than floor coverings.

More particularly, the invention relates to a panel, more particularly a floor panel of the type which substantially is manufactured of synthetic material and more specifically of supple or soft synthetic material, wherein these panels, on at least two opposite edges, comprise coupling parts which allow coupling two of such panels to each other.

2. Related Art

Floor panels realized in this manner are known, amongst others, from US 2002/0189183 and WO 2011/077311. The coupling parts applied herein are made in one piece with the floor panels and provide for a locking in a first direction located in the plane of the floor panels and perpendicular to the respective edges, as well as in a locking in a second direction, perpendicular to the plane of the panels. From these documents, it is also known that the coupling parts on at least two opposite edges can be realized such that they allow coupling two of such floor panels to each other by means of a downward movement, by which is meant that one floor panel is pressed home or locked at its edge on the edge of another floor panel by means of a downward movement. Such coupling parts are also known by the denomination "push-lock".

From WO 2011/077311, it is also known to apply "push-lock" coupling parts on only one pair of sides of floor panels of the above-mentioned type and to combine them with coupling parts on the other pair of sides, which can be coupled by means of a turning movement. In this case, this is called a "fold-down" system. Said "fold-down" system is particularly popular for panels substantially consisting of wood or wood-based board materials, primarily because of the increased simplicity of installation which can be obtained by means of such "fold-down" system. In the case of floor panels which substantially are manufactured of synthetic material, and more specifically of supple or soft synthetic material, they leave much to be desired. The supple synthetic material of the panels can lead to an insufficient strength of the coupling. Moreover, floor panels of the above-mentioned type are considerably subjected to expansion and/or shrinkage under the influence of temperature variations. As a result of such expansion and/or shrinkage, the floor panels may show gaps at the height of their adjoining edges, in case of shrinkage, or may be pushed upward, in case of expansion, such that in the first place in case of so-called "push-lock" connections or fold-down systems, the coupling parts can be pressed out of each other. The risk of being pushed upward during such expansion is associated with the restricted bending stiffness of such panels.

SUMMARY

In the first place, the invention relates to alternative panels, more particularly floor panels, which substantially are composed of synthetic material. According to various preferred embodiments, it is also striven for a solution for one or more of the aforementioned problems with floor panels consisting of synthetic material known from the state of the art.

To this aim, the invention, according to a first aspect, relates to a floor panel for forming a floor covering, wherein this floor panel substantially consists of synthetic material; wherein this floor panel has a decorative upper side; wherein the floor panel, on at least one pair of opposite edges, comprises coupling parts which allow coupling two of such floor panels to each other, wherein these coupling parts effect a locking in a first direction perpendicular to the plane of the floor panels as well as in a second direction perpendicular to the respective edge and in the plane of the floor panels, with the characteristic that at least one of said coupling parts comprises a separate element, more particularly a separate locking element, wherein this locking element, in the coupled condition of two of such floor panels, provides for at least a locking at the respective edges in said first direction and/or allows or enables a snapping on of the respective coupling parts of two of such panels by means of a downward coupling movement. Preferably, said coupling parts comprise integrated mechanical locking means, which effect a locking in said second direction, namely a horizontal direction. In that use is made of a separate locking element, the coupling parts of the floor panel can be optimized further. More particularly, by applying a separate locking element, it is possible to work with alternative materials, to wit with materials differing from the basic material of the panel, wherein these materials may show specific characteristics, such as pressure strength and/or elasticity, such that possibly a more beneficial locking of the floor panels can be obtained. In this manner, such separate locking elements can be realized in synthetic material or in metal, such that relatively strong, however, still easily movable locking parts can be realized, which, for example, can take up relatively large forces with a minimum contact surface.

By "separate locking element", a locking element is intended which is produced separately and is provided in the panel either at the factory or by the user or installer. Herein, the separate locking element can be provided loosely in a recess or the like provided on the floor panel for this purpose, or can be fixedly attached to the floor panel, for example, by mechanically locking the locking element in an adapted recess, or by fixing it by gluing in a recess provided for this purpose, or by attaching it to the panel in any other manner. Preferably, the separate locking element is provided at the factory, preferably by means of machinery. However, it is not excluded that, without leaving the scope of the present invention, the separate locking element shall be provided by the user or installer.

According to the invention, by the "separate locking element" in the first place an element has to be understood which is present in the floor panel rather locally, more particularly in the edge of the floor panel, wherein this preferably exclusively provides for a vertical locking, contrary to locking elements as known from WO 2007/141605, wherein such locking element forms an essential component of the edge and provides for the locking in horizontal as well as in vertical direction. Thus, said separate locking element preferably relates to an element, more particularly a strip, which is located on one of the lateral sides of the edge profiles.

It is noted that the use of a separate locking element, which is provided rather locally in the edge of a floor panel, is already known, amongst others, from the patent documents WO 2009/066153 and U.S. Pat. No. 7,454,875 for locking relatively thick and/or rigid floor panels, more particularly laminate floor panels.

Up to date, it was not obvious to apply such separate locking elements for relatively thin floor panels, for example, for floor panels of 5 mm or thinner, and certainly not for the herein below also described supple floor panels, more particularly so-called LVT floor panels. On the one hand, one started from the point that, as synthetic material as such is supple, always the elasticity of the basic material of the panels can be applied for forming locking parts thereof which elastically engage behind each other. In the case of push-lock coupling parts or fold-down systems, however, a balance had to be sought, wherein the coupling parts are sufficiently elastic for pressing the respective locking parts home until they are behind each other, and these coupling parts, as well as the floor panel itself of which they are formed, still are sufficiently rigid for obtaining a sturdy coupling and a sufficiently pressure-resistant floor covering. In many cases, the obtained balance has proven insufficient. On the other hand, it was started from the point that a stable integration of a separate element in a thin panel, which moreover consists of a movable or supple material, to wit compressible synthetic material, was impossible. Surprisingly, the inventor has found that the integration of such separate locking elements is possible indeed and that surprisingly good results can be obtained therewith, in particularly for push-lock coupling parts and/or fold-down systems.

As already stated herein above, the present invention shows its advantages in particular when it is applied with floor panels which substantially are manufactured of supple or soft synthetic material or, in other words, with supple panels.

By supple panels, panels are intended, which, when they, in the case of a rectangular panel having a width of, for example, less than 50 centimeters, are clamped on one of two short sides of the panel and herein protrude over a length of 100 centimeters and are not supported, said panels will bend through under the influence of their own weight, wherein this bending through, at the height of the free extremity, is minimum 10 centimeters in respect to the clamped extremity. For this bending through, a bending-through time of 10 seconds is considered and wherein the panel starts from a flat horizontal position.

A possibility with floor panels which substantially consist of supple or soft synthetic material, is the possibly restricted dimensional stability thereof. When a plurality of such floor panels are in coupled condition, due to temperature variations important loads or deformations of the floor panels may be created, and more particularly in the proximity of the coupling parts of these floor panels. This may lead to problems with a floor covering which is composed of such panels, and in particular when this herein relates to a so-called floating floor covering, wherein the panels are coupled to adjacent panels at their edges only and thus are not connected to the underlying surface by means of a possible glue connection or other connection. More specifically, these problems relate, amongst others, to the creation of gaps at the height of the edges of the floor panels; the pushing upward of the floor panels, more particularly at the height of the edges of the floor panels; the disconnection or, in other words, the interruption of the coupling of the floor panels; and the like. From the state of the art, for example, from US 2011/296780 or US 2012/135203, it is known to increase the dimensional stability of such floor panels to a certain extent by applying one or more layers of glass fiber embedded in the soft synthetic material. However, such layer of glass fiber does not contribute to the strength of the mutual coupling between the panels themselves.

Applying, according to the invention, a separate locking element with supple floor panels allows obtaining an even better mutual coupling of the panels. More particularly, by applying a separate locking element a stronger coupling of the floor panels can be obtained, wherein this stronger coupling is particularly pronounced in said first direction perpendicular to the plane of the floor panels. Therefore, the invention allows forming floating floor coverings by means of supple panels, which remain stable within a larger range of temperature variations.

The present invention further shows its advantages in particular when applied for floor panels of the type which generally is indicated by the English term "Resilient floor panels". To this type of floor panels, amongst others, a vinyl panel is pertaining, more particularly a so-called vinyl tile, and in particular a panel of the so-called LVT type ("Luxury Vinyl Tile") or VCT type ("Vinyl Composite Tile", also called "Vinyl Composition Tile"). Herein, this mostly relates to panels of so-called soft PVC (PolyVinyl Chloride), which usually is made of PVC in which plasticizers or the like are incorporated. Preferably, at least 12 percent of weight of plasticizer is applied in the PVC mixture; possible fillers, such as chalk, not taken into account.

According to a preferred embodiment, it relates to a panel, more particularly a floor panel, wherein the coupling parts, at least at one pair of opposite sides, allow coupling two of such floor panels to each other by means of a downward movement of one floor panel in respect to the other. More particularly, seen in cross-section, by means of a downward translation movement. This type of coupling sometimes is also indicated as a coupling of the "push" or "fold-down" type. The present invention shows its advantages in particular with panels which, at least at one pair of opposite sides, preferably on the short sides in the case of a rectangular panel, comprise coupling parts which, as aforementioned, can be coupled to each other by means of a downward movement. Such coupling can increase the easiness of installation. It is noted that herein coupling parts are intended which as such can be automatically entirely coupled by means of a downward movement, as well as coupling parts which, apart from the downward movement, still require an additional operation for completing the coupling. Such additional operation may include, for example, the coupling of a subsequent floor panel or a floor panel in an adjacent row. In this last case, this is called "side push", as by means of the floor panel in the adjacent row, a lateral pressure force is exerted on a separate locking element, by which this locking element arrives in a position in which it effects the locking in said first direction. Such side-push systems are known as such for rigid panels, for example, from WO 2008/004960.

According to the invention, the floor panel has a decorative upper side. Preferably, the floor panel is substantially composed of a substrate and a top layer. It is clear that said top layer does not necessarily have to consist of synthetic material. This top layer can serve, amongst others, as a decorative layer and/or as a wear layer. The top layer as such can also consist of a plurality of layers, such as, for example, a decorative layer and a wear layer. According to a variant, the floor panel is free from a separate top layer, such that the floor panel as such forms or is the substrate.

Preferably, said top layer comprises at least a decorative layer in the form of a print. Hereby, the appearance of the panel or the appearance of the decorative surface can be chosen freely and can be given a random decorative character. For example, said decorative layer can relate to a printed film, more particularly a printed thermoplastic film. Preferably, a wear layer on the basis of thermoplastic material is located above the printed film, for example, on the basis of PVC or soft PVC. Applying a printed film, more particularly a printed thermoplastic film, together with a thermoplastic wear layer offers advantages in respect to the occurrence of wear in such panels. Namely, when coupling a plurality of such panels, minor height differences can appear between the decorative upper sides of two coupled panels. In such cases, the top layer is subject to wear in particular in the edge regions. Using a thermoplastic film and idem wear layer leads to a restriction of this wear, in view of the fact that it can be made somewhat compressible, for example, that as such, it can consist of PVC or soft PVC.

As aforementioned, the top layer preferably comprises at least a translucent or transparent wear layer. According to a possible embodiment, said wear layer is present in the form of a transparent thermoplastic wear layer. Preferably, said wear layer is free from corundum particles or other wear-resistant particles.

The top layer can be finished with a lacquer layer, which is provided as a liquid layer on said wear layer and/or decorative layer and subsequently is hardened. Preferably, this relates to a lacquer layer which can be hardened by UV light. Preferably, a lacquer layer is provided above the possible wear layer.

Preferably, the floor panel according to the invention relates to a floor panel wherein this floor panel, or at least the substrate of the floor panel, substantially is composed of a thermoplastic material, preferably a soft thermoplastic material. There are different possibilities for composing such floor panel, two possibilities of which will be explained below.

According to a first and most preferred possibility, the floor panel, or at least the substrate of the floor panel, is composed of a plurality of layers of material, preferably layers of thermoplastic material, more particularly soft thermoplastic material. Possibly, the different layers of thermoplastic material of the substrate mutually can include one or more glass fiber layers, such as a glass fiber cloth or glass fiber nonwoven. According to the most preferred embodiment, the substrate consists of two soft PVC layers, which mutually include a glass fiber layer, preferably a glass fiber fleece or so-called "non-woven". Preferably, these layers of the substrate further also comprise fillers, such as an amount of chalk. Preferably, the panels have a density situated between 1250 and 2250 kilograms per cubic meter.

According to a second possibility, the substrate of the floor panel is composed of a single layer of thermoplastic material, more particularly soft thermoplastic material.

According to a preferred embodiment, the floor panel, or at least the substrate of the floor panel, substantially is composed of polyvinyl chloride, more particularly of soft polyvinyl chloride, namely PVC which comprises plasticizers. Preferably, use is made of PVC obtained from a PVC homopolymer of suspension quality having a K-value between 50 and 80 or still better between 60 and 67.

In particular in floor panels with a substrate of soft PVC, however, in other floor panels, too, the possible blocking body of the separate locking element preferably is made of hard PVC, preferably PVC comprising cadmium or zinc stabilizers. The hard PVC of the locking element, more particularly the blocking body, thus offers an answer to the suppleness of the substrate. Moreover, the combination of soft PVC of the substrate and hard PVC of the blocking body can lead to an optimum possibility for recycling. Moreover, extrusion techniques or coextrusion techniques are highly suitable for realizing such locking elements.

Preferably, the possible attachment portion consists of the same or a similar synthetic material as the blocking body.

Preferably, the synthetic material of the possible hinge portion consists of polyurethane.

It is noted that the floor panel of the invention preferably comprises a substrate which contains plasticizers. In such floor panels, applying a separate locking element is particularly interesting, as temperature variations in such floor panels lead to a leaching out of the plasticizers which are present, which may imply additional dimensional alterations. Moreover, the suppleness of such panels may diminish after a certain period of time, which might influence the equality of the coupling. By applying a separate locking element, this ageing can be avoided at least partially. According to a specific embodiment, this relates to a floor panel, wherein this floor panel comprises a substrate containing plasticizers of the DINP type, more particularly with a mass radio of 20% to 40%, possible filler not taken into account.

According to a variant, this relates to a floor panel, wherein said floor panel is substantially free from plasticizers.

As aforementioned, the floor panel of the invention, besides the synthetic material, can also comprise a filler, preferably chalk or a chalk-like material. Applying a filler primarily has the purpose of reducing the necessary amount of synthetic material and/or making the panel heavier. In some cases, a heavier panel has the advantage that the panel is more stable and/or remains better at its location during placement and/or after installation.

Preferably, the separate locking element is made as an insert, preferably in the form of a strip, wherein this insert is present in a recess provided to this aim in one of the aforementioned edges of the floor panel, and wherein this separate locking element comprises at least a portion which is laterally movable and in this manner can work in conjunction with a locking portion on an adjacent similar floor panel, wherein this cooperation then preferably results in said locking in the first direction.

Preferably, said laterally movable portion is elastically movable, such that this portion, during coupling of two of such floor panels, is moved sideways, against an elastic force, in order to then come back into a locking position. For example, the laterally movable portion can consist substantially of a pivotable blocking body. Preferably, the separate locking element is at least composed of an attachment portion on the one hand and a pivotable blocking body on the other hand. Preferably, the blocking body is connected to the attachment portion by means of a hinge portion. Applying a hinge portion allows elastically attaching a relatively rigid blocking body to a rigid attachment portion. In this manner, elastic movability of the blocking body can be combined with a good locking strength in said first direction. Preferably, in coupled condition said blocking body extends over a vertical distance which is smaller than 1.9 times the vertical distance defined by the attachment portion. This ratio forms a compromise between, on the one hand, obtaining a sufficiently solid locking, more particularly a vertical locking, and, on the other hand, a sufficiently solid connection of the separate locking element.

Preferably, the separate locking element substantially consists of a strip of synthetic material. Applying synthetic material allows allocating the separate locking element the desired features in respect to elasticity, pressure strength. Further, applying synthetic material offers almost unlimited possibilities for the design of the separate locking element. This is of particular importance when the thickness of the floor panel and consequently the dimensions of the separate locking element are very small, for example, in floor panels having a thickness of 5 millimeters or less. Preferably, the separate locking element substantially consists of a coextruded strip, which, seen in cross-section, comprises zones of synthetic material having different features, more particularly materials of different flexibility. Preferably, said possible hinge portion is made of a more flexible material than the blocking portion and/or the attachment portion.

Preferably, said coupling parts comprise locking parts which engage behind each other, in the form of an upward-directed locking part, which is provided on a first lip on a first of said two edges, and a downward-directed locking part, which is provided on a second lip on the second of said two edges, wherein these locking parts engaging behind each other effect a locking in said horizontal direction. Preferably, the upward-directed locking part, seen in cross-section, extends over a height which is at least 24% of the overall thickness of the floor panel. Preferably, the thickness of the first lip, seen in cross-section, diminishes in a direction from the middle of the floor panel towards the free extremity of the first lip, preferably substantially in that the contour of the upper side of the first lip slopes downward, whether or not stepped.

In the case of an upward-directed locking part, the latter preferably also shows one or more of the following features:
the feature that the highest point of the upward-directed locking part is situated in a horizontal plane, wherein this horizontal plane extends between the lower surface and the upper surface of the recess in which the separate locking element is attached to the panel;
the feature that the highest point of the upward-directed locking part is situated in a horizontal plane, wherein this horizontal plane H2 intersects the possible blocking body, either in coupled condition or in not-coupled condition, or in both;
the feature that the highest point of the upward-directed locking part is situated in a horizontal plane, wherein this horizontal plane extends above the locking portion with which the possible blocking body works in conjunction.

Each of these features, separately or in combination, leads to a more solid connection of two of such panels, in the first as well as in the second direction.

Preferably, the panel of the invention relates to a rectangular floor panel, either oblong or square; wherein said pair of opposite edges forms a first pair of edges, whereas the remaining two opposite edges form a second pair of edges; wherein on the second pair of edges of the floor panel, coupling parts are provided, of the type allowing to couple two of such floor panels to each other along the respective edges by means of a turning movement, wherein these coupling parts provide for a vertical and a horizontal locking and preferably are made in one piece with the floor panel. Preferably, the coupling parts on the second pair of edges substantially are made in the form of a tongue and a groove. Preferably, the floor panels, more particularly the coupling parts, are configured such that the panels, on the first pair of edges, can be automatically engaged in each other as the result of a turning downward along the second pair of edges, more particularly in such a manner that a plurality of panels can be systematically installed according to the so-called "fold-down" principle.

The present invention, although not restrictive, is particularly suitable for thin floor panels, more particularly for floor panels having a thickness of 3 millimeters through 6 millimeters, and still more particularly of 3 millimeters through 5 millimeters.

According to a possible embodiment of the present invention, the floor panel shows the following characteristics:
the floor panel is substantially composed, on the one hand, of a core or a substrate, wherein this core or this substrate is constructed of material forming the basic material of the floor panel, and, on the other hand, of a top layer, in other words, a surface layer, which top layer as such is or is not constructed of a plurality of layers;
said coupling parts of the respective pair of edges are substantially realized in the form of a tongue and a groove; and said coupling parts comprise integrated mechanical locking means which effect a locking in said second direction, to wit a horizontal direction;
as aforementioned, said coupling parts, including the integrated mechanical locking means, are realized with a separate element which allows or enables a connection by snapping on of the respective coupling parts of two of such panels by means of a downward translation movement, to wit in vertical direction;
the basic material of the floor panel of which the aforementioned core is composed, substantially comprises soft thermoplastic material, and wherein this thermoplastic material possibly contains a filler;
and said top layer comprises a printed thermoplastic film and a transparent thermoplastic wear layer, wherein said transparent thermoplastic wear layer is thinner than 0.85 millimeters and is free from fillers.

It is clear that the invention also relates to a floor covering which is composed of floor panels as described herein above.

The panel or floor panel of the invention preferably comprises at least one reinforcing layer, preferably formed of fibers, more particularly reinforcing fibers, such as glass fibers. The use of such reinforcing layer, and in particular a reinforcing layer with fibers, enhances the dimensional stability of the floor panels. This is of particular importance with floor panels for loose installation, because, by applying fibers, the expansion and/or shrinkage of the panel under the influence of temperature variations can be reduced considerably. Hereby, the risk that the coupled floor panels will separate from each other as a result of expansion and/or shrinkage, can be minimized further. It is noted that said reinforcing fibers can be present in a variety of forms, such as also in the form of, for example, a cloth, a nonwoven or a net, more particularly, for example, a glass fiber cloth or a glass fiber non-woven. Preferably, viewed in cross-section of the panel, said fibers are applied in one or more horizontal layers. Preferably, at least one of said layers is located at the height of said separate locking element. Hereby, the advantage is created that, see from the point of view of connection features, the floor panel is kept dimensionally stable in an optimum manner on the most critical level, namely at the location of the locking element.

In the case that a single reinforcing layer, for example, a single layer with fibers, is applied, this layer preferably is situated in the middle or approximately in the middle of the panel. In this manner, a symmetrical composition of the floor panel is obtained, which offers advantages in respect to the stability of the floor panel. According to a particular preferred embodiment, two or more reinforcing layers are applied, which preferably are located at a distance from each other. In the case of two reinforcing layers, the latter, seen in cross-section, preferably are situated on opposite sides of the neutral line of the floor panel. Hereby, the advantage is created that bending forces in both directions can be counteracted. This is particularly advantageous for relatively supple floor panels which substantially are manufactured of soft PVC.

The invention further also relates to a method for manufacturing floor panels as described herein above, wherein this method comprises at least the following steps:
  forming the floor panel of a synthetic material;
  providing profiles at the height of one or more edges of the floor panel;
  providing glue in a recess present in the respective edge of the floor panel and providing for the application of a separate locking element;
  providing a separate locking element in said recess. Preferably, the step of providing the separate locking element is performed by means of a forming wheel with which the recess provided for this purpose is provided in the edge of the floor panel.

BRIEF DESCRIPTION OF THE DRAWINGS

With the intention of better showing the characteristics of the invention, herein below, as an example without any limitative character, some preferred embodiments are described, with reference to the accompanying drawings, wherein:

FIG. 8, at a larger scale, represents the separate locking element which is provided in the pair of edges of FIG. 2;

FIGS. 9 and 10 represent in perspective how the long and the short edges of the floor panel of FIG. 1 can be coupled to similar floor panels, wherein FIG. 10 at a larger scale shows a view of the area indicated by F10 in FIG. 9;

DETAILED DESCRIPTION OF VARIOUS EMBODIMENTS

In FIGS. 1 to 7, an embodiment is represented of a panel 1 according to the invention, which is realized as a floor panel.

In the represented example, the panel 1 is realized as an oblong rectangular strip and thus comprises a first pair of opposite edges 2-3, which in this case form the long sides of the panel 1, and a second pair of opposite edges 4-5, which form the short sides of the panel 1.

Figure 1:
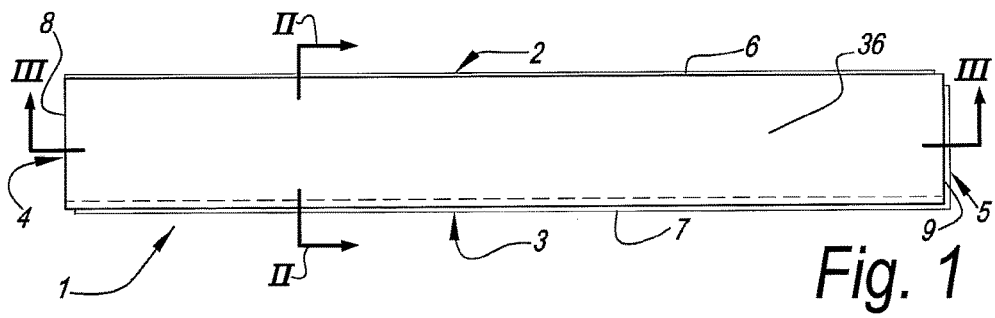
FIG. 1 represents a panel having the characteristics of the invention.
Figure 2:
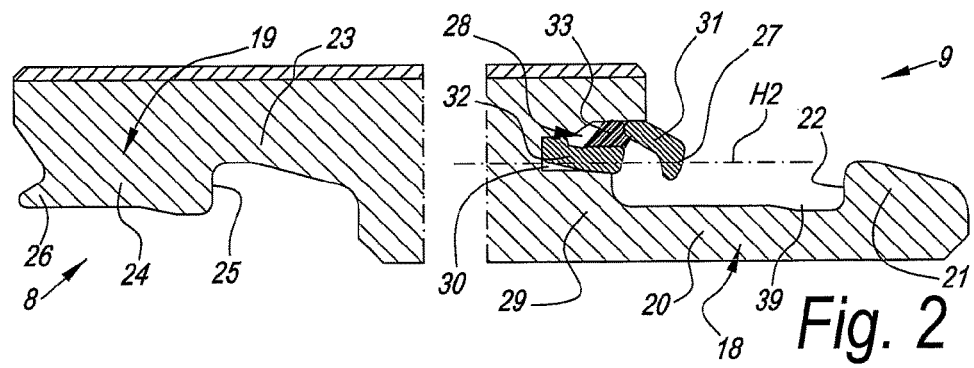
FIGS. 2 and 3, at a larger scale, respectively represent a cross-section according to the lines II-II and represented in FIG. 1.
Figure 3:
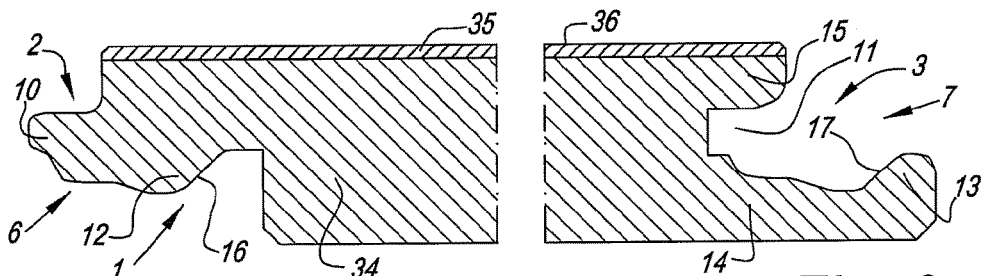

As is represented more detailed in FIGS. 2 and 3, both pairs of opposite edges 2-3 and 4-5 comprise coupling parts 6-7, 8-9, respectively, which allow that a plurality of such panels 1 mutually can be coupled to each other.

Figure 4:
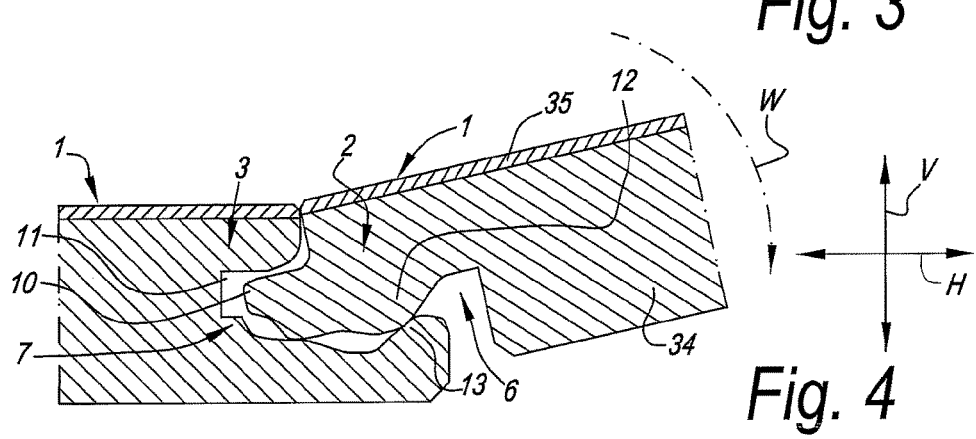
FIG. 4 represents how two floor panels can be coupled together at the edges of FIG. 3.

As specifically represented in FIGS. 3 and 4, coupling parts 6-7 on the first pair of edges 2-3 are configured such that two of such panels can be coupled to each other in a locking manner at these edges 2-3 by means of a turning movement W. Herein, the coupling parts 6-7 form a first locking system which effects a locking in the plane of the panels 1 and perpendicular to said edges 2-3, thus, in this case, in the horizontal direction H, as well as a second locking system which effects a locking transverse to the plane of the panels 1, in this case, thus, in the vertical V or the first direction mentioned in the introduction. To this aim, the coupling parts 6-7 are constructed as a tongue 10 and a groove 11 which provide for the vertical locking and comprise locking parts 12-13, which, in the coupled condition, prevent the drifting apart of tongue and groove.

Herein, it is preferred that, as represented, the groove 11 is bordered by a lower lip 14 and an upper lip 15 and that the locking parts 12 and 13 are made in the form of mutually cooperating protrusions on the underside of the tongue 10 and on the upper side of the lower lip 14, respectively. The cooperation is performed by means of locking surfaces 16 and 17 provided for this purpose. As also represented, it is also preferred that the lower lip 14 extends laterally beyond the distal extremity of the upper lip 15, more particularly in such a manner that the locking surface 17 is located entirely in that portion of the lower lip 14 which is situated outward of the upper lip 15.

Figure 5:
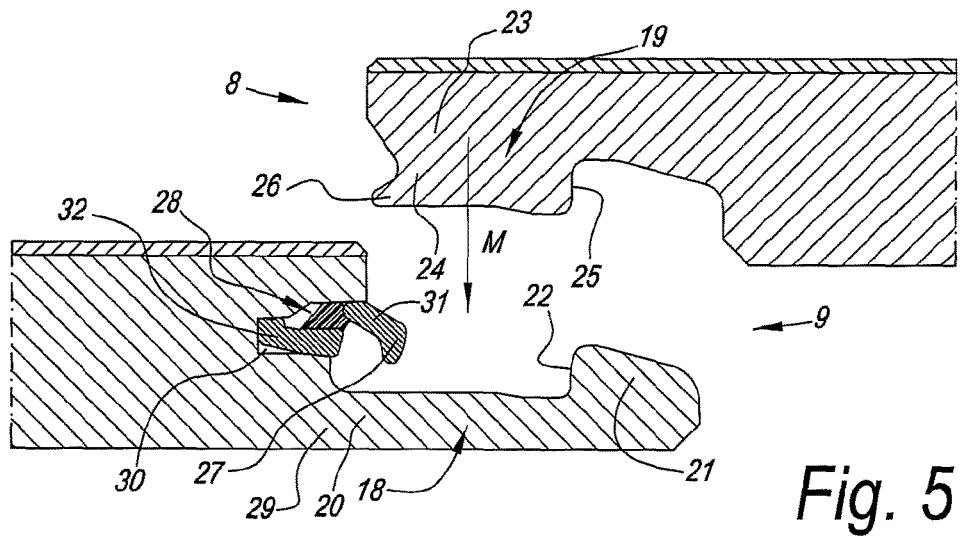
FIGS. 5 to 7 represent how such floor panels can be coupled at the edges represented in FIG. 2.
Figure 6:
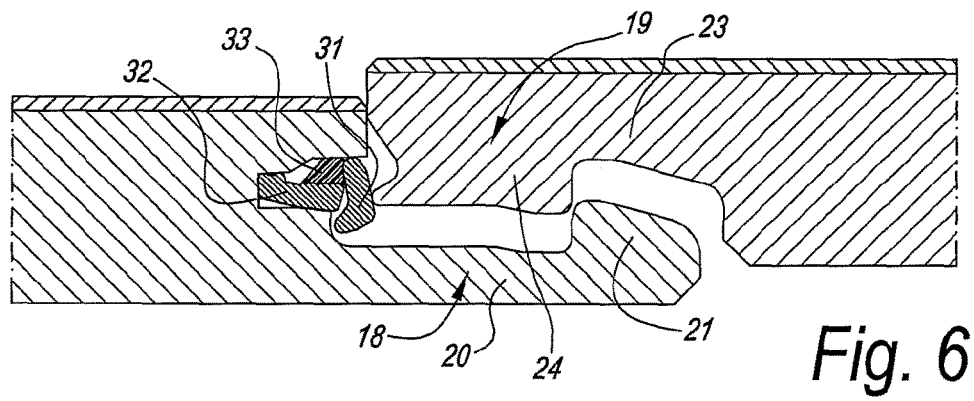
Figure 7:
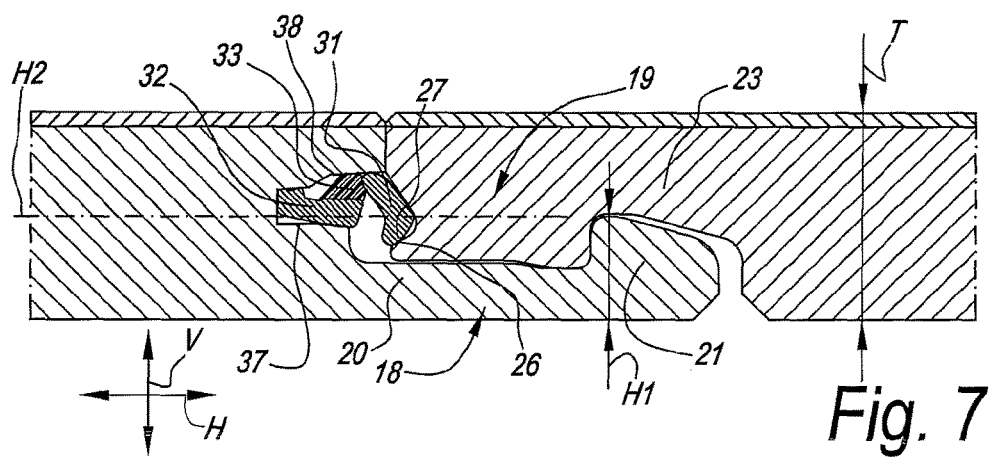

As schematically represented in FIGS. 5 to 7, the coupling parts 8-9 on the second pair of opposite edges 4-5 are configured such that two of such panels 1 can be coupled to each other by means of a downward movement M of one panel in respect to the other. This downward movement M will be explained below in more detail.

As is clearly illustrated in FIG. 7, the coupling parts 8-9 hereby form a first locking system which effects a locking transverse to the plane of the panels 1, in this case, thus, in the vertical direction V, as well as a second locking system which effects a locking in the plane of the panels 1 and perpendicularly to said edges 4-5, thus, in this case, in the horizontal direction H. Herein, the vertical direction forms the first direction mentioned in the introduction, and the horizontal direction forms the second direction mentioned there.

The second locking system or the integrated mechanical locking means are substantially formed of an upward-directed lower hook-shaped part 18, which is situated on the edge 5, as well as a downward-directed upper hook-shaped part 19, which is situated on the opposite edge 4, which hook-shaped parts can be engaged behind each other by said downward movement M. The lower hook-shaped part 18 consists of a lip 20 which extends laterally from the lower edge of the panel 1 and which is provided with an upward-directed locking element 21 with a locking surface 22, whereas the upper hook-shaped part 19 consists of a lip 23 which extends laterally from the upper edge of the panel 1 and which is provided with a downward-directed locking element 24 with a locking surface 25.

The first locking system of the edges 4-5 on the short sides is formed by locking parts or locking portions 26-27. According to the invention, the coupling parts 8-9 for this purpose comprise a separate element or separate locking element 28, which, in coupled condition, as represented in FIG. 7, provides at least for a locking in said first direction or vertical direction V. In the example, the separate locking element 28 is situated in the female coupling part 9, more particularly in the proximity of the proximal extremity 29 of the lower hook-shaped part 18.

As represented in FIGS. 5 to 8, the separate locking element 28 is made as an insert in the form of a strip and is provided in a recess 30 in one of the edges 5. In this case, the separate locking element 28 comprises a pivotable blocking body 31, which, as represented, amongst others, in FIG. 6, is laterally movable and consequently can cooperate with the locking portion 26 of an adjacent floor panel 1. The blocking body 31 is elastically movable and, towards the end of the downward movement M, arrives in a locking position, as represented in FIG. 7. In the locking position, the blocking body 31 comes into contact with the locking portion 26 of an adjacent floor panel 1. This contact results in said locking in the first direction V.

The separate locking element 28 represented here further also comprises an attachment portion 32, wherein the blocking body 31 is connected to the attachment portion 32 via a hinge portion 33. In this case, a clamping fit of the attachment 32 in the recess 30 is applied. According to an important alternative, the attachment portion 32 is connected to the panel 1 at least in that it is glued into such recess 30.

In the examples, the separate locking element consists of a coextruded strip, which, seen in the plane of the FIGS. 5 to 8, comprises zones of synthetic material with different features, wherein the zone of the hinge portion 33 is made of a more flexible material than the zone of the blocking body 31 and the zone of the attachment portion 32.

It is noted that the coupling parts 8-9 substantially can also be considered a tongue and groove coupling, wherein the locking part 26 functions as a tongue, whereas the groove in which this tongue is placed, is defined by the locking part 27, which functions as an upper lip, and the first hook-shaped part 18, which functions as a lower lip.

It is noted that the space between the vertically active locking part 27 and the horizontally active locking element 21, which is also indicated by opening H, functions as a female part, whereas the locking element 24 is made as a male part which fits into the female part.

The panel 1 of the examples is substantially formed on the basis of soft polyvinyl chloride (PVC). More specifically, it comprises a substrate which is realized on the basis of soft PVC, which substrate is indicated in the figures by reference 34. In these figures, this substrate is schematically depicted as a single layer. In reality, this may be a single layer as well as a plurality of layers, wherein they do not all have to consist of PVC. On the substrate, usually a top layer 35 is provided, which, in the figures, is also represented by a single layer only, however, in reality may also consist of a plurality of layers. The top layer 35 at least aims at providing a decorative upper side 36 on the panel 1, preferably in the form of a printed decor, and, at least in the case of a floor panel, at providing that a wear-resistant surface is offered.

As indicated in FIG. 7, the panels have an overall thickness T. The thickness T preferably has a value situated between 3 and 10 mm. In particular in a practical embodiment, it shall be in the range between 3 and 6 mm.

The example of the figures further also shows the preferred characteristic that the upward-directed locking part 21, seen in cross-section, extends over a height H1 which is at least 24% of the overall thickness T of the floor panel 1. Herein, the highest point of this upward-directed locking part 21 is situated in a horizontal plane H2 located between the lower surface 37 and the upper surface 38 of the recess 30 and/or in a horizontal plane H2 intersecting the blocking body 31, in this case both in coupled condition and in not-coupled condition. Moreover, the horizontal plane H2 extends above the locking portion 26 with which the blocking body 31 works in conjunction.

It is noted that said coupling parts, 6-7 as well as 8-9, as represented, with the exception of said separate locking element, preferably are formed in one piece of the material of the actual panel 1, more particularly of the substrate material. As a consequence thereof, the coupling parts as such also substantially consist of soft PVC. It is noted that these portions of the coupling parts 6-7 and 8-9 preferably are formed by means of a machine treatment, more particularly milling treatments. Milling techniques which allow providing locking coupling parts on the edges of panels are known, amongst others, from WO 97/47834. Thus, by means of choosing appropriate milling cutters and an appropriate adjustment thereof, suitable profiles, for example, as are represented in the figures, can be realized.

In FIGS. 8 and 9 is schematically represented how the panels 1 can be installed. In order to illustrate the method, a number of the panels 1 in their turn are indicated by references 1A, 1B and 1C for extra distinction. The panels 1 are installed row by row and coupled to each other. For obtaining that the panels 1-1A-1B-1C are coupled on the edges 2-3 as well as 4-5, the method comprises at least the following steps:

installing a first panel 1A which is intended for forming part of a first row of panels; coupling a second panel 1B to said first panel 1A, such on first edges 2-3, wherein this second panel 1B is intended for forming part of a second row following said first row of panels;

coupling, in the second row, a third panel 1C to said first panel 1B as well as to the first panel 1A, wherein the third panel 1C is coupled to the first panel 1A by means of a turning movement, wherein the third panel 1C, from an upward-turned position, is brought into substantially the same plane as the first and second panels, whereas, as a consequence of this movement and the downward movement created thereby, the hook-shaped portions 18-19 between the third and second panel engage in each other.

It is clear that usually, between the installation of the first panel 1A and the coupling thereto of the second panel 1B, first also all further panels of the row in which the first panel 1A is situated, are installed. Coupling the second panel 1B to the first panel 1A of course is also performed by connecting the panel 1B, at its edge 2, by means of a turning movement W, as represented in FIG. 4, to the edge 3 of the first panel 1A and possible other panels of the row of the panel 1A.

When connecting the panel 1C to the panel 1A, also a turning movement W, as in FIG. 4, is applied. Herein, on the short edges 4-5 a downward movement M is performed, by which the coupling parts 8 and 9 are joined together.

By this downward movement M, in a very broad sense any form of movement is intended wherein, in a cross-section as seen in FIGS. 5 to 7, the one panel is put down from a higher position in respect to the other. This movement M does not necessarily have to be a straight-lined movement, and during this movement temporarily deformations may occur in the panels and more particularly in the hook-shaped portions 18 and 19.

Theoretically, a downward movement M, which, seen in cross-section, is straight-lined or approximately straight-lined, can be applied for connecting a panel 1C with a panel 1B, which means that the right-hand panel in FIG. 6, seen in cross-section, simply is pressed straight down into the position of FIG. 7.

It is also noted that the examples of the figures also represent that said lip 20 of the lower hook-shaped portion 18 diminishes in thickness from the middle of the floor panel 1 towards the free extremity of this lip, at least over a portion of this lip 20. In the example, this feature is obtained in that the upper side of the lip 20 has a stepped downward contour and thus a deeper-situated portion 39 of this lip 20 is formed, in this case just in front of the upward-directed locking portion 21.

Figure 11:
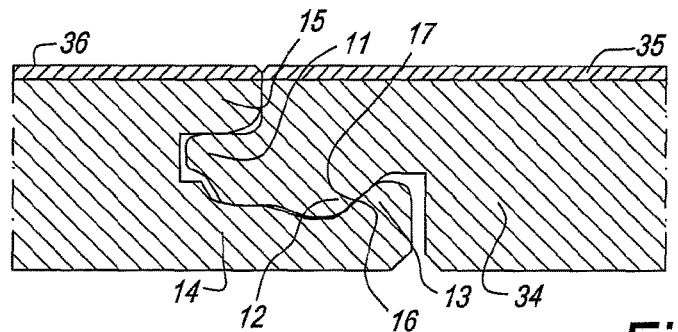
FIG. 11, for clarity's sake, represents the coupling parts from FIG. 4 in completely coupled condition.

In FIG. 11, for clarity's sake the edges 2-3 are represented again in a completely coupled condition.

Figure 12:
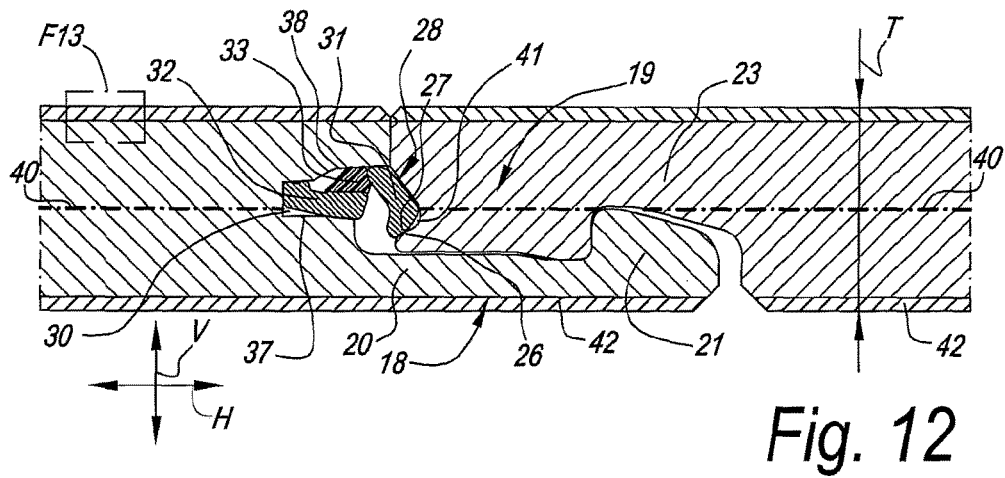
FIG. 12 represents a variant of the invention, for a view similar to that of FIG. 7.

In FIG. 12, a variant of the invention is represented, wherein a reinforcing layer 40 is incorporated into the panel 1.

This reinforcing layer 40 as such can be in any form or any material. Preferably, however, it is made on the basis of glass fiber, for example, in the form of a glass fiber net, a glass fiber mat, a layer of strewn-in glass fibers or the like.

According to a preferred aspect, the whole is configured such that the reinforcing layer 40 defines a plane, which, in the coupled condition of two of such panels, extends through the separate locking element 28 or at least through a portion thereof. Moreover, it is also preferred that this plane intersects at least with the recess 30 in which the locking element 28 is provided, or intersects with a recess 41 in which the locking part 26 is present, and still better intersects with both of these recesses 30 and 41. Hereby, an even balance is obtained in respect to possible inner material forces, as a result of which the risk of possible undesired material deformations in the edge regions of the panels is minimized.

Further, it is also preferred that, at least when only one reinforcing layer is applied, this reinforcing layer 40, viewed in cross-section, is located in the middle of the substrate.

It is noted that also in embodiments in which a reinforcing layer 40 is applied, the substrate can be composed of one or more layers.

In order to obtain an even higher stability, also two or more of such reinforcing layers can be applied in the substrate, which layers then are located at a distance above each other. As a consequence of the higher stability thereby obtained, the positioning of the two or more layers in respect to the locking element 28 then is hardly critical.

It is noted that on all panels of the invention, as far as they comprise a top layer 35 provided on a substrate, a balancing backing layer 42 can be present on the underside, too. This backing layer is explicitly represented in FIG. 12 only, by way of example. It is also noted that the top layer 35 and the backing layer 42 in FIG. 12 are represented only schematically and that these layers in reality, in relation to the thickness of the substrate, mostly have a smaller thickness than is represented in the figure.

Figure 13:
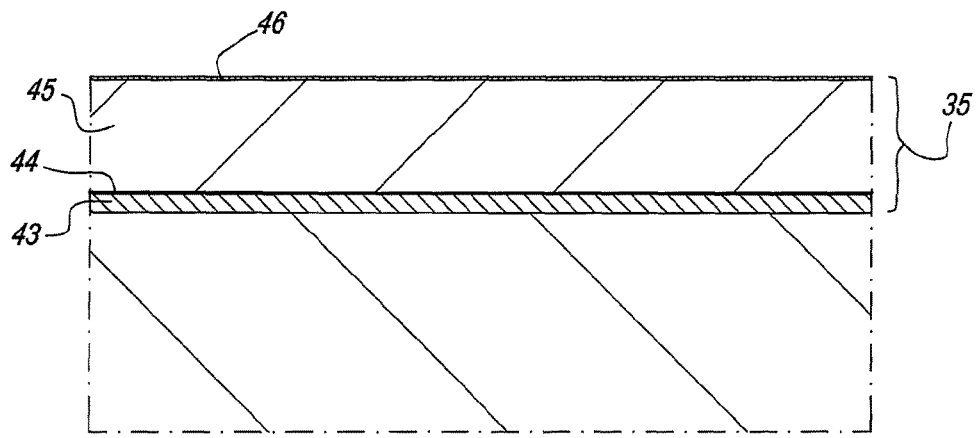
FIG. 13, at a larger scale, represents a view of the portion represented by F13 in FIG. 12.

FIG. 13 illustrates in greater detail how, for example, a top layer 35 of a panel according to the invention can be constructed. In this example, the top layer 3 consists of a film 43, for example, a PVC film, which is provided with a decorative print 44, and of a provided thereon transparent wear layer or film 45, as well as preferably also a transparent lacquer layer 46.

Figure 14:
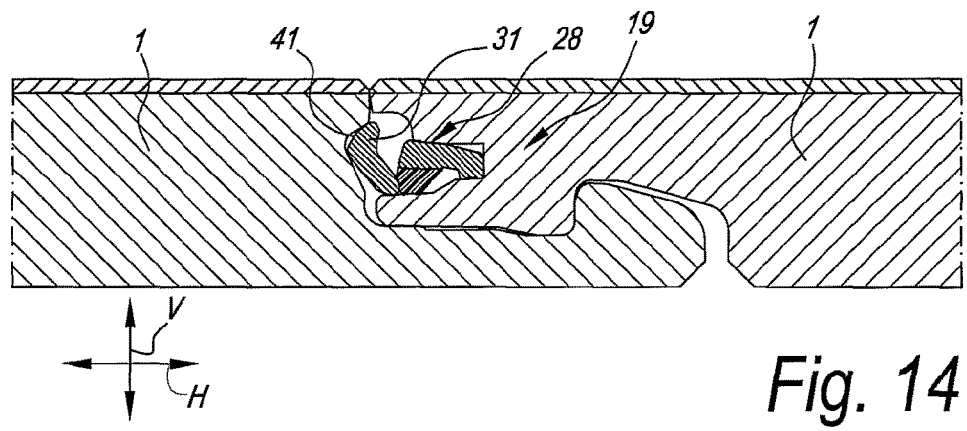
FIGS. 14, 15 and 16 represent three other variants of the invention.

In FIG. 14, a variant is represented, wherein the separate locking element 28 is mounted in the upper hook-shaped part 19. The turnable blocking body 31 then is directed upward with its free extremity.

Figure 15:
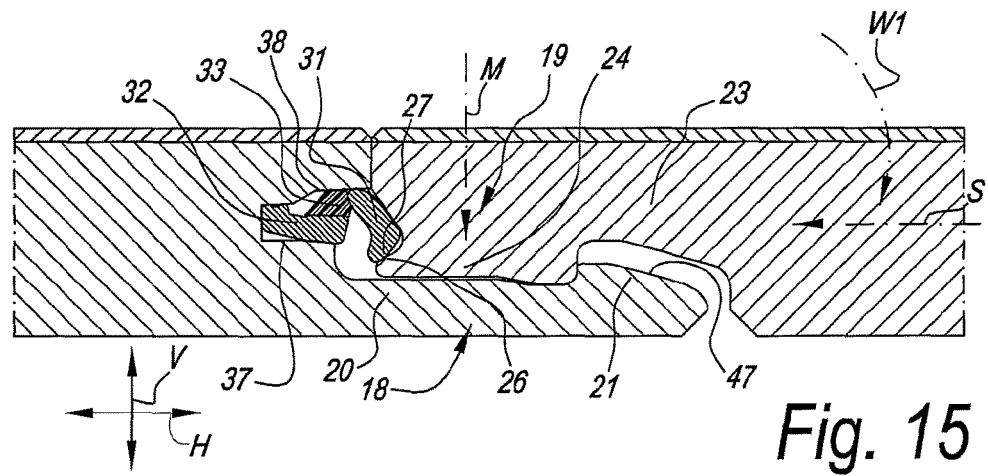

FIG. 15 represents another variant, wherein the locking elements 21 and 24 are configured such that two of such panels can be joined together at the respective edges by means of a downward movement M as well as a shifting and snap-on movement S. To this aim, the locking element 21 is realized relatively low and is also provided with a ramp surface 47. Possibly, also a joining by means of a turning movement W1 is possible.

Figure 16:
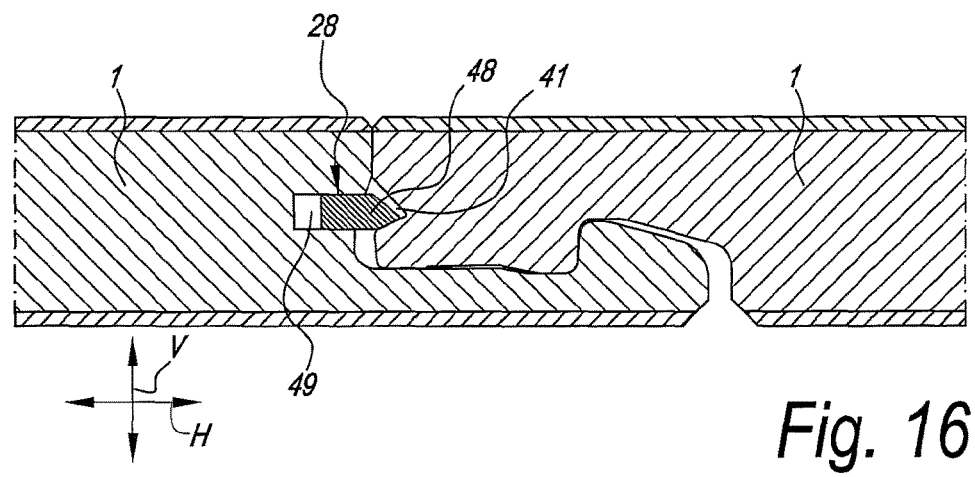

Although preferably use is made of separate locking elements of the type comprising a turnable blocking body 31, it is not excluded to apply other forms of separate locking elements. For example, as schematically illustrated in FIG. 16, use can be made of a locking element 28 in the form of a displaceable, more particularly slidable tongue 48.

In the example, this relates to a tongue in the form of a strip which is bent in a banana shape in the plane of the panel and thus protrudes in the middle from the recess 49 concerned. During the joining of the panels, the central portion of the tongue is bent elastically inward until the recess 41 arrives in front of the tongue and the tongue springs back outward, which results in the coupled condition.

It is clear that, when using a displaceable tongue, the invention is not restricted to such bent tongue. For example, use can also be made of a tongue behind which, whether or not attached thereto, a springy element is present which allows that the tongue, during coupling, can be displaced inward against an elastic force. According to another possibility, use shall be made of a tongue which is displaced outward as a result of the installation of a subsequent row of panels.

It is noted that, according to a not represented variant, such displaceable tongue can also be present on the locking part 19.

According to a particular embodiment of the invention, a separate locking element of metal is applied, preferably in the form of a metal strip and/or tongue. The advantage of using metal is that even with a very thin strip a sturdy connection can be realized as well as sufficient elastic force can be generated via the strip. The metal embodiment is particularly useful in combination with a tongue as illustrated in FIG. 16, as then, viewed in the height, a very thin and flat tongue which, for example, is bent in a banana shape, can be applied, for example, a tongue which in height extends over only 1 mm or less.

Figure 17:
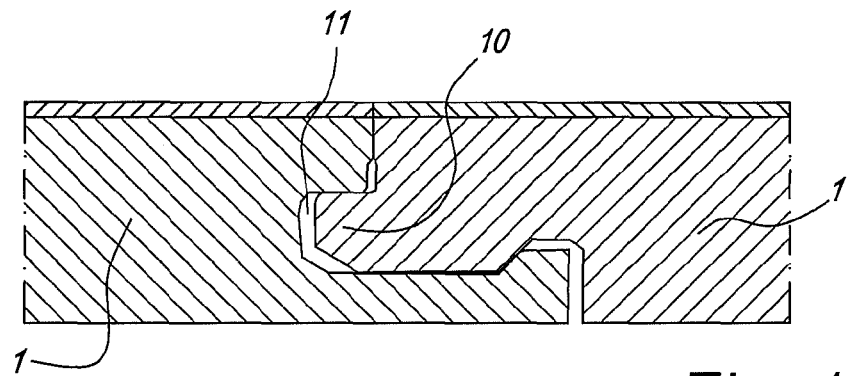
FIG. 17 represents a variant of the embodiment of FIG. 4.
Figure 18:
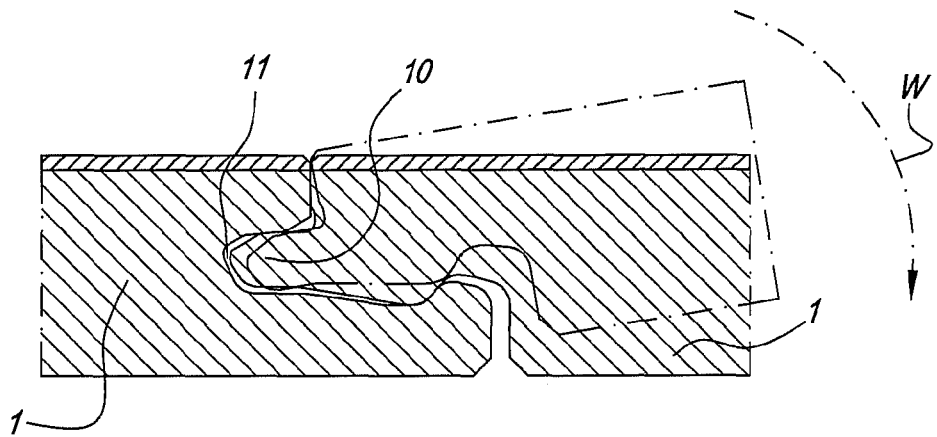
FIGS. 18 and 19 represent another variant of the embodiment of FIG. 4.
Figure 19:
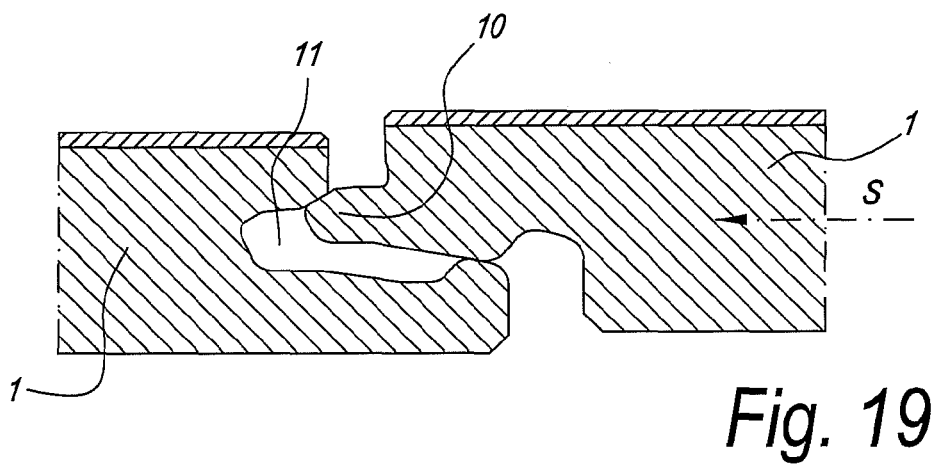

Finally, it is also noted that coupling parts 6-7 of any shape can be applied on the first pair of edges 2-3. As an example, FIG. 17 represents a variant with a more angled shape of the tongue and groove. FIGS. 18 and 19 represent still another variant, with a slimmer tongue, underneath which, in coupled condition, an interspace is extending.

The present invention is in no way restricted to the herein above-mentioned embodiments; on the contrary, such floor panels, floor coverings and methods for manufacturing them can be realized according to various variants, without leaving the scope of the present invention.

The invention claimed is:

1. A floor panel for forming a floor covering,
    wherein this floor panel at least comprises a substrate and a decorative upper side;
    wherein the substrate is based on synthetic material;
    wherein the floor panel is rectangular, either oblong rectangular or square, and comprises a first pair of opposite edges and a second pair of opposite edges;

wherein the floor panel, on both pairs of opposite edges, comprises coupling parts which allow coupling such floor panels to each other wherein the coupling parts at the first pair of opposite edges are of the type which allows coupling two of such floor panels to each other by means of a downward movement of one floor panel in respect to the other;

wherein the coupling parts at the first pair of opposite edges comprise a first locking system which in the coupled condition of two of said panels effects a locking in vertical direction and a second locking system which in the coupled condition of two of such panels effects a locking in the horizontal direction;

wherein said second locking system comprises locking parts engaging behind each other, in the form of an upward-directed locking part, which is provided on a first lip on a first of said two edges, and a downward-directed locking part, which is provided on a second lip on the second of said two edges, respectively, wherein these locking parts, in the coupled condition of two of said panels, engage one behind the other, and effect said locking in horizontal direction;

wherein the upmost point of the upward-directed locking part defines a theoretical horizontal level;

wherein said first locking system comprises locking portions at the respective edges, which in the coupled condition of two of such panels co-operate with each other, at least one of said locking portions comprising a locking surface located at the downward-directed locking part, which locking surface in the coupled condition of two of such panels is located below said horizontal level, said locking surface providing a locking against disconnection of two of such panels in the coupled condition by vertical separation;

wherein the second lip, seen in cross-section, comprises a bridging portion, the bridging portion being a portion of the second lip extending from a most proximal end of the second lip up to the downward-directed locking portion;

wherein in the coupled condition, said bridging portion in horizontal direction overlaps the first lip of the coupled panel, thereby defining a horizontal distance over which said bridging portion overlaps said first lip;

wherein said bridging portion of the second lip over the majority of said horizontal distance and in distal direction of this second lip is decreasing in thickness; and wherein on the second pair of edges of the floor panel, coupling parts are provided of the type which allows coupling two of such floor panels to each other along the respective edges by means of a turning movement, wherein these coupling parts provide for a vertical and a horizontal locking and are made in one piece with the floor panel.

2. The floor panel of claim 1, wherein the downward directed locking part has a distal side and a proximal side; and wherein said at least one locking portion that is located at the downward-directed locking part, at a location below said horizontal level, is provided at said distal side of the downward-directed locking part.

3. The floor panel of claim 1, wherein the substrate substantially consists of thermoplastic material.

4. The floor panel of claim 1, wherein the floor panel has a thickness of 3 through 6 millimeters.

5. The floor panel of claim 1, wherein the floor panel is of the supple type.

6. The floor panel of claim 1, wherein the floor panel is a vinyl panel, a vinyl tile, a panel of the LVT type ("Luxury Vinyl Tile") or VCT type ("Vinyl Composite Tile" or "Vinyl Composition Tile").

7. The floor panel of claim 1, wherein the floor panel comprises a substrate and a top layer, and wherein the top layer comprises at least a decorative layer or a decorative print layer.

8. The floor panel of claim 1, wherein the floor panel comprises at least one reinforcing layer, at least one reinforcing layer formed of fibers, or reinforcing fibers including glass fibers.

9. A floor panel for forming a floor covering,
wherein this floor panel at least comprises a substrate and a decorative upper side;
wherein the floor panel is rectangular, either oblong rectangular or square, and comprises a first pair of opposite edges and a second pair of opposite edges;
wherein the floor panel, on both pairs of opposite edges, comprises coupling parts which allow coupling such floor panels to each other;
wherein the coupling parts at the first pair of opposite edges are of the type which allows coupling two of such floor panels to each other by means of a downward movement of one floor panel in respect to the other;
wherein the coupling parts at the first pair of opposite edges comprise a first locking system which in the coupled condition of two of said panels effects a locking in vertical direction and a second locking system which in the coupled condition of two of such panels effects a locking in the horizontal direction;
wherein said second locking system comprises locking parts engaging behind each other, in the form of an upward-directed locking part, which is provided on a first lip on a first of said two edges, and a downward-directed locking part, which is provided on a second lip on the second of said two edges, respectively, wherein these locking parts, in the coupled condition of two of said panels, engage one behind the other, and effect said locking in horizontal direction;
wherein the upmost point of the upward-directed locking part defines a theoretical horizontal level;
wherein said first locking system comprises locking portions at the respective edges, which in the coupled condition of two of such panels co-operate with each other, at least one of said locking portions comprising a locking surface located at the downward-directed locking part, which locking surface in the coupled condition of two of such panels is located below said theoretical horizontal level, said locking surface providing a locking against disconnection of two of such panels in the coupled condition by vertical separation;
wherein the second lip, seen in cross-section, comprises a bridging portion, the bridging portion being a portion of the second lip extending from the most proximal end of the second lip up to the downward-directed locking portion;
wherein said bridging portion of the second lip over the majority of its horizontal length in distal direction of this second lip is decreasing in thickness;
wherein the floor panel has a lower side surface which is intended to act as a supporting surface, wherein this supporting surface, seen in a cross-section perpendicular to the first pair of edges, extends along the lower side of the first lip, thereby also extending underneath at least half of the upward-directed portion;

wherein said first lip extends underneath the downward directed locking part; and wherein on the second pair of edges of the floor panel, coupling parts are provided of the type which allows coupling two of such floor panels to each other along the respective edges by means of a turning movement, wherein these coupling parts provide for a vertical and a horizontal locking and are made in one piece with the floor panel.

10. The floor panel of claim 9, wherein the downward directed locking part has a distal side and a proximal side; and wherein said at least one locking portion that is located at the downward-directed locking part, at a location below said horizontal level, is provided at said distal side of the downward-directed locking part.

11. The floor panel of claim 9, wherein the substrate substantially consists of thermoplastic material.

12. The floor panel of claim 9, wherein the floor panel has a thickness of 3 through 6 millimeters.

13. The floor panel of claim 9, wherein the floor panel is of the supple type.

14. The floor panel of claim 9, wherein the floor panel is a vinyl panel, a vinyl tile, a panel of the LVT type ("Luxury Vinyl Tile") or VCT type ("Vinyl Composite Tile" or "Vinyl Composition Tile").

15. The floor panel of claim 9, wherein the floor panel comprises a substrate and a top layer, and wherein the top layer comprises at least a decorative layer or a decorative print layer.

16. The floor panel of claim 9, wherein the floor panel comprises at least one reinforcing layer, at least one reinforcing layer formed of fibers, or reinforcing fibers including glass fibers.

17. A floor panel for forming a floor covering, wherein this floor panel at least comprises a substrate and a decorative upper side;

wherein the substrate is comprised of thermoplastic material;

wherein the floor panel is rectangular, either oblong rectangular or square, and comprises a first pair of opposite edges and a second pair of opposite edges;

wherein the floor panel, on both pairs of opposite edges, comprises coupling parts which allow coupling such floor panels to each other wherein the coupling parts at the first pair of opposite edges are of the type which allows coupling two of such floor panels to each other by means of a downward movement of one floor panel in respect to the other;

wherein the coupling parts at the first pair of opposite edges comprise a first locking system which in the coupled condition of two of said panels effects a locking in vertical direction and a second locking system which in the coupled condition of two of such panels effects a locking in the horizontal direction;

wherein said second locking system comprises locking parts engaging behind each other, in the form of an upward-directed locking part, which is provided on a first lip on a first of said two edges, and a downward-directed locking part, which is provided on a second lip on the second of said two edges, respectively, wherein these locking parts, in the coupled condition of two of said panels, engage one behind the other, and effect said locking in horizontal direction;

wherein the upmost point of the upward-directed locking part defines a theoretical horizontal level;

wherein said first locking system comprises locking portions which in the coupled condition of two of such panels co-operate with each other to provide a locking against disconnection of the panels by vertical separation, at least one of said locking portions in the coupled condition of two of such panels being located below said theoretical horizontal level;

wherein the second lip, seen in cross-section, comprises a bridging portion, the bridging portion being a portion of the second lip extending from the most proximal end of the second lip up to the downward-directed locking portion;

wherein in the coupled condition, said bridging portion in horizontal direction overlaps the first lip of the coupled panel, thereby defining a horizontal distance over which said bridging portion overlaps said first lip;

wherein said bridging portion of the second lip over the majority of said horizontal distance and in distal direction of this second lip is decreasing in thickness; and wherein on the second pair of edges of the floor panel, coupling parts are provided of the type which allows coupling two of such floor panels to each other along the respective edges by means of a turning movement, wherein these coupling parts provide for a vertical and a horizontal locking and are made in one piece with the floor panel.

18. The floor panel of claim 17, wherein the substrate substantially consists of thermoplastic material.

19. The floor panel of claim 17, wherein the floor panel has a thickness of 3 through 6 millimeters.

20. The floor panel of claim 17, wherein the floor panel is of the supple type.

21. The floor panel of claim 17, wherein the floor panel is a vinyl panel, a vinyl tile, a panel of the LVT type ("Luxury Vinyl Tile") or VCT type ("Vinyl Composite Tile" or "Vinyl Composition Tile").

22. The floor panel of claim 17, wherein the floor panel comprises a substrate and a top layer, and wherein the top layer comprises at least a decorative layer or a decorative print layer.

23. The floor panel of claim 22, wherein the top layer comprises at least a translucent or transparent wear layer.

24. The floor panel of claim 17, wherein the floor panel comprises at least one reinforcing layer, at least one reinforcing layer formed of fibers, or reinforcing fibers including glass fibers.

25. The floor panel of claim 17, wherein, the floor panel has a lower side surface which is intended to act as a supporting surface, wherein this supporting surface, seen in a cross-section perpendicular to the first pair of edges, extends along the lower side of the first lip, thereby also extending underneath at least half of the upward-directed portion.

* * * * *